United States Patent [19]
Carey et al.

[11] Patent Number: 5,905,982
[45] Date of Patent: May 18, 1999

[54] HANDLING NULL VALUES IN SQL QUERIES OVER OBJECT-ORIENTED DATA

[75] Inventors: Michael James Carey; Gerald George Kiernan, both of San Jose, Calif.

[73] Assignee: International Business Machines Corporation, Armonk, N.Y.

[21] Appl. No.: 08/835,113

[22] Filed: Apr. 4, 1997

[51] Int. Cl.$^6$ .................................................... G06F 17/30
[52] U.S. Cl. ..................... 707/4; 707/2; 707/3; 707/4; 707/5; 707/103; 707/202
[58] Field of Search ................... 707/2, 3, 4, 5, 707/103, 202

[56] References Cited

U.S. PATENT DOCUMENTS

| | | | |
|---|---|---|---|
| 5,504,885 | 4/1996 | Alashqur ..................................... | 707/4 |
| 5,590,324 | 12/1996 | Leung et al. ................................. | 707/5 |
| 5,630,120 | 5/1997 | Vachey ........................................ | 707/2 |
| 5,713,015 | 1/1998 | Goel et al. ................................... | 707/4 |
| 5,724,570 | 3/1998 | Zeller et al. ................................. | 707/3 |
| 5,732,258 | 3/1998 | Jakobsson et al. .......................... | 707/4 |
| 5,761,493 | 6/1998 | Blakeley et al. ............................. | 707/4 |
| 5,774,692 | 6/1998 | Boyer et al. ............................. | 395/500 |

OTHER PUBLICATIONS

Subqueries in SQLF, a fuzzy database query language, Patrick Bosc, 1995 IEEE (Cat. No. 95CH3576–7) (ISBN: 0 7803 2559 1) p. 3636–41, vol. 4, 22–25 Oct. 1995.

Query execution strategies for missing data in distributed hetrogeneous object databases, Koh et al., p. 466–73, IEEE Computer Soc. Press, ISBN: 0 8186 7399 0, 27–30 May 1996.

Won Kim, "Object–Oriented Database Systems: Promises, Reality, and Future", Proc. 19th VLDB Conference, Dublin, Ireland, Aug., 1993.

Michael J. Carey et al., "A Data Model and Query Language for EXODUS", Proc. ACM SIGMOD International Conference on Management of Data, Chicago, Illinois, Jun., 1988.

Won Kim, "A Model of Queries for Object–Oriented Databases", Proc. 15th VLDB Conference, Amsterdam, The Netherlands, Aug., 1989.

Francois Bancilhon et al., "A Query Language for the $O_2$ Object–Oriented Database System", Proc. 2nd International Workshop on Database Programming Languages, Morgan–Kaufmann Publishers, Inc., Gleneden Beach, Oregon, Jun., 1989.

(List continued on next page.)

*Primary Examiner*—Wayne Amsbury
*Assistant Examiner*—Shahid Alam
*Attorney, Agent, or Firm*—Merchant, Gould, Smith, Edell, Welter, & Schmidt

[57] ABSTRACT

A method, apparatus, and article of manufacture for handling NULL values in SQL queries over object oriented data. A two-phase method is used to enable a query evaluator in a two-valued logic environment to properly handle occurrences of NULL values for predicates that involve subqueries, i.e., basic subquery predicates and/or quantified subquery predicates. For basic subquery predicates, negation reduction is performed by applying logical equivalence rules and inverting basic comparators (e.g., transforming < to >=) to eliminate NOTs. Then, transformations are employed for the resulting positive predicates to include NULL value testing, i.e., NULL protection. For quantified subquery predicates, in addition to performing negation reduction, quantified subqueries are converted into existential subqueries. In most cases, this yields a predicate that can be handled using NULL protection transformations for positive predicates. The exception (i.e., a "NOT EXISTS" resulting from the conversion step of a universally quantified subquery) is handled using NULL protection transformations for negative predicates. The evaluation of the NULL tested positive and negative predicates ensures that if a predicate has a NULL value, it is not included in the query result.

50 Claims, 4 Drawing Sheets

OTHER PUBLICATIONS

Jack Orenstein et al., "Query Processing in the ObjectStore Database System", Proc. ACM SIGMOD International Conference on Management of Data, San Diego, California, Jun., 1992.

Michael Kifer et al., "Querying Object–Oriented Databases", Proc. ACM SIGMOD International Conference on Management of Data, San Diego, California, Jun., 1992.

S. Dar et al., "CQL++: A SQL for the Ode Object–Oriented DBMS", Proc. 3rd International Conference on Extending DataBase Technology, Advances in Database Technology–EDBT '92, Springer–Verlag, Vienna, Mar. 1992.

Jose A. Blakeley et al., "Experiences Building the Open OODB Query Optimizer", Proc. ACM SIGMOD International Conference on Management of Data, Washington, D.C., May, 1993.

Charles Lamb et al., "The ObjectStore Database System", Communications of the ACM, Oct., 1991.

HANDLING NULL VALUES IN SQL QUERIES OVER OBJECT-ORIENTED DATA

RESERVATION OF RIGHTS

A portion of the disclosure of this patent document contains material which is subject to copyright protection. The copyright owner has no objection to the facsimile reproduction by anyone of the patent document as it appears in the Patent and Trademark Office patent files or records, but otherwise reserves all copyright rights whatsoever.

BACKGROUND OF THE INVENTION

1. Field of the Invention

This invention relates in general to systems, methods, and computer programs in the field of processing database queries in database management systems (DBMSs), including relational, hierarchical, and object-oriented DBMSs, and in particular to handling NULL values in SQL queries over object oriented data.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (DASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American Nationals Standard Organization (ANSI) and the International Standards Organization (ISO). The current SQL standard is known informally as SQL/92.

In RDBMS software, all data is externally structured into tables. The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the DBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

Today, a DBMS can instead be an object-oriented database (OODB), wherein the database is organized into objects having members that can be pointers to other objects. An object can have relationships to other objects. The objects contain references, and collections of references, to other objects in the database, thus leading to databases with complex nested structures.

The integration of object technology and database systems has been an active area of research for the past decade. One important aspect of the integration of these two technologies is the provision of efficient, declarative query interfaces for accessing and manipulating object data. Compared to other aspects of object-oriented database (OODB) technology, such as integrating persistence into object-oriented languages like C++ and Smalltalk, queries were given relatively little attention in the early days of OODB research. Mike Stonebraker, *Third Generation Data Base System Manifesto*, Computer Standards & Interfaces, 12, December 1991, which is incorporated by reference herein.

In Won Kim, *Object-Oriented Database Systems: Promise, Reality, and Future*, Proc. 19th International Conference on Very Large Data Bases, Dublin, August 1993, which is incorporated by reference herein, it is pointed out that even today, a number of commercial OODB systems are quite weak in this regard. As the OODB field has developed, however, a number of proposals for OODB query languages have appeared in the database literature including the following publications:

- Michael J. Carey, David DeWitt, and Scott Vandenberg, *A Data Model and Query Language for EXODUS*, Proc. ACM-SIGMOD International Conference on Management of Data, Chicago, June 1988;
- Won Kim, *A Model of Queries for Object-Oriented Databases*, Proc. 15th International Conference on Very Large Data Basses, Amsterdam, August 1989;
- Francois Bancilhon, S. Cluet, and C. Delobel, *A Query Language for the $O_2$ Object-Oriented Database System*, Proc. 2nd International Workshop on Database Programming Languages, Morgan-Kaufmann Publishers, Inc., Gleneden Beach, June 1989, [hereinafter referred to as "BCD89"];
- Jack Orenstein, Sam Haradhvala, and Benson Margulies, Don Sakahara, *Query Processing in the ObjectStore Database System*, Proc. ACM-SIGMOD International Conference on Management of Data, San Diego, June 1992, [hereinafter referred to as "OHMS92"];
- S. Dar, N. Gehani, and H. Jagadish, *COL++: A SQL for a C++ Based Object-Oriented DBMS*, Proc. International Conference on Extending Data Base Technology, Advances in Database Technology—EDBT '92, Lecture Notes in Computer Science, Springer-Verlag, Vienna, 1992;
- Michael Kifer, Won Kim, and Yehoshua Sagiv, *Querying Object-Oriented Databases*, Proc. ACM-SIGMOD International Conference on Management of Data, San Diego, June 1992;
- Tom Atwood, Joshua Duhl, Guy Ferran, Mary Loomis, and Drew Wade, *Object Query Language*, Object Database Standards: ODMG—93 Release 1.1, ed. R. G. G. Cattell, Morgan-Kaufmann Publishers, Inc., 1993, [hereinafter referred to as "ADF+93"];
- José Blakeley, William J. McKenna, and Goetz Graefe, *Experiences Building the Open OODB Query Optimizer*, Proc. ACM SIGMOD International Conference on Management of Data, Washington, D.C., May 1993;

all of which are incorporated by reference herein.

Some commercial object-oriented database systems that offer object query facilities are O2, discussed in BCD89, and ObjectStore, discussed in OHMS92. Each of these object-oriented database systems provides their own flavor of object query language. ObjectStore's query language is an extension to the expression syntax of C++. O2's query language is generally more SQL-like, and has been adapted into a proposed object-oriented database query language standard (ODMG-93) by a consortium of object-oriented database system vendors, ADF+93, which is incorporated by reference herein, but it differs from SQL in a number of respects, Won Kim, *Observations on the ODMG-93 Proposal*, ACM SIGMOD Record, 23(1), March 1994, [hereinafter referred to as "Kim94"], which is incorporated by reference herein.

Furthermore, it should be noted that SQL3 supports object relational queries, and Illustra Relational Database System includes object oriented SQL extensions. See, the publication by Jim Melton, ed., *ISO-ANSI Working Draft: Database Language SQL (SQL3); ISO/IEC SC21 WGS DBL YOW*-004 and ANSI XSH2-94-084, ISO_ANSI, 1995, [hereinafter referred to as "Mel95"], which is incorporated by reference herein.

In RDBMS software using the SQL-92 query language, columns are of simple atomic types, and columns appear in queries as c or q.c where c is a column of some table and q is a correlation name or range variable. In query languages for Object-Oriented DBMSs, column expressions are replaced with path expressions that allow traversal through pointers, embedded classes and structs, multi-valued collections, and relationships to reach nested attributes.

Mel95 proposes traversal through embedded structures as Abstract Data Types (ADT). For example, if "e" is a correlation, "address" is an ADT of type Address, "zip" is an attribute of address, and the ".." characters are used to express traversal through embedded structures, then "e.address..zip" expresses the traversal through the Address structure to obtain the attribute "zip". It should be noted that the SQL3 draft has been further extended to include support for typed rows, references to rows, and a dereference operator ($\rightarrow$).

In RDBMSs, columns of any type can assume NULL (i.e., unknown) values. In RDBMS software, NULL values are properly handled using tri-valued logic (i.e., TRUE, FALSE, or UNKNOWN) for predicates, and SQL-based RDBMSs employ such a logic. The OODB and C++ worlds are different; for example, neither C++ nor the ObjectStore OODBMS nor the ODMG standard has a general notion of NULL values, and their predicates are therefore based upon a two-valued logic (i.e., TRUE, FALSE). Most OODB systems support two-valued logic (TRUE or FALSE), and therefore cannot handle NULL values. See, OHMS92 and Charles Lamb, Gordon Landis, Jack Orenstein, and Dan Weinreb, *The Objectstore Database System*, Communications of the ACM, 1991, [hereinafter referred to as "LLOW91"]; Bjarne Stroustrup, *The C++ Programming Language*, Addison-Wesley Publishing Co., 1987, [hereinafter referred to as "Str87"]; Margaret A. Ellis and Bjarne Stroustrup, *Annotated C++ Reference Manual*, Addison-Wesley Publishing Co., 1990, [hereinafter referred to as "Ell90"]; all of which are incorporated by reference herein.

In the early 1980's, a pre-OODB project the GEM project, discussed in C. Zaniolo, *The Database Language GEM*, In Proc., ACM-SIGMOD International Conference on Management of Data, 1983, [hereinafter referred to as "Zan83"] and S. Tsur and C. Zaniolo, *An Implementation of GEM: Supporting a Semantic Data Model on a Relational Backend*, In Proc., ACM-SIGMOD International Conference on Management of Data, 1984, [hereinafter referred to as "TZ84"], which are incorporated by reference herein, extended the relational data model and the QUEL query language with entity-relationship features that were quite similar to those found in many of today's object-oriented query languages.

The GEM project was designed as a layer over a RDBMS that added entity-relationship modeling extensions to the relational model. The GEM project, which has a tri-valued logic, was implemented over a RDBMS that had a two-valued logic and did not support NULL values. The GEM project simulated NULL values by requiring an arbitrary value of an attribute to be selected to represent NULL values, as described in Zan83 and TZ84. For example, the value zero could be selected. Then, a test such as (e.sal IS NULL) would be implemented as (e.sal=0).

To translate GEM queries into underlying relational queries, GEM converted its tri-valued logic into two-valued logic, as described in TZ84. The GEM project developed tri-valued to two-valued logic transformations for the following forms of predicate expressions, as described in TZ84:

t.A r k t.A r s.B

Here, s and t are correlations over tables, k is a constant, A and B are columns of t and s respectively that can have NULL values, and r is a relational operator among $\{=, \neq, <, \leq, >, \geq\}$. An example of the first type of predicate above is (e.sal>100), and an example of the second type of predicate above is (e.did=d.no). The previous examples can be scoped by negation: (not (e.sal>100)) and (not (e.did=d.no)) respectively. Negation is determined by counting the number of NOT's from the root of the predicate tree. If the number is odd, the expression is negative, otherwise it is positive. For example, in (not (not e.sal>100)), the subexpression (e.sal>100) is a positive expression, whereas in the expression (not (not (not e.sal>100))), the subexpression (e.sal>100) is a negative expression because it is scoped within an odd number of NOT'S. Positive expressions are replaced as follows:

t.A r k $\rightarrow$(t.A IS NOT NULL and t.A r k)

t.A r s.B$\rightarrow$(t.A IS NOT NULL and t.B IS NOT NULL and t.A r s.B)

The predicate (e.sal>100) is transformed into the predicate (e.sal IS NOT NULL and e.sal>100). Similarly, the predicate (e.did=d.no) is transformed into the predicate (e.did IS NOT NULL and d.no IS NOT NULL and e.did=d.no). Negative expressions are replaced as follows:

not (t.A r k)$\rightarrow$not (t.A IS NULL or t.A r k)

not (t.A r s.B)$\rightarrow$not (t.A IS NULL or s.B IS NULL or t.A r s.B)

The predicate (not (e.sal>100)) is transformed into the predicate (not (e.sal IS NULL or e.sal>100)). Similarly, the predicate (not. (e.did=d.no)) is transformed into the predicate not ((e.did IS NULL or d.no IS NULL or e.did=d.no)). If the predicate is not within the scope of negation, the "IS NOT NULL" test guarantees that bindings for which the predicate evaluates to NULL return FALSE. Inversely, if the predicate is within the scope of negation, the "IS NULL" test guarantees that after the application of negation, bindings for which the predicate evaluates to NULL return FALSE.

The GEM project handles simple scalar comparisons, but it does not address predicates involving subqueries that can arise in SQL-92 queries. Subqueries were not an issue for the GEM project, because the GEM query language was based on the QUEL query language, not on SQL. SQL-92 includes predicates of the form: e r Q, and e r $\alpha$ Q in which e is an expression, r is a relational operator, $\alpha$ is a qualifier among {ANY, ALL} and Q is a subquery (note: the IN quantified predicate is not detailed here since e IN Q is equivalent to e=ANY Q and e NOT IN Q is equivalent to e$\neq$ALL Q).

The first form of predicate is a basic predicate with a subquery, while the second is a quantified subquery. The following query is an example of a basic predicate with a subquery, and retrieves employees who earn more than the average salary of employees in their departments.

```
select *
from Emp e
where e.sal>(select avg (e1.sal) from (e.dept.emps) e1)
```

The next query is an example of a query with a quantified subquery and selects employees who have the highest salary of employees in their departments.

```
select *
from Emp e
where e.sal>=all (select e1.sal from (e.dept.emps) e1)
```

Although the GEM query language introduced path expressions (functional joins, in GEM terminology) with the NULL-related semantics, their published transformations in TZ84 did not properly address the handling of NULL values when translating path expressions into QUEL queries. In particular, the transformations presented in TZ84 did not respect the outer-join-like NULL semantics of path expressions that was specified in Zan83.

As noted above, the other shortcoming of GEM was that it did not attempt to handle basic predicates with a subquery or quantified subqueries since GEM was based upon the QUEL query language which does not have subqueries. The SQL-92 query language does include predicates with a subquery including quantified subqueries. SQL-92 also provides an interpretation of the predicates with subqueries if a NULL value is encountered. However, the interpretation specifies when a predicate including a sub-query is NULL, and that is based on tri-valued logic.

The GEM project also did not address NULL pointers. With object-oriented DBMS software, pointer data types are available and attributes of these data types can be NULL. The notions of NULL value and NULL pointer differ in many respects. While NULL values are excluded from most object-oriented data models, they are reintroduced in object-oriented SQL queries where path expressions can include attributes that are NULL pointers. The object-oriented database world, as described in OHMS92 and LLOW91, and the C++ language environment, as described in Str87 and Ell90, do not support NULL values, and their predicates are therefore based upon a two-valued logic. However, both do have pointer types that can be NULL-valued, which leads to NULL-related problems for queries that involve navigation through potentially NULL pointers. Simply ignoring NULL pointers during path expression evaluation could cause the query engine for an object-oriented system (or any other two-valued logic environment having NULL pointers) to fail at run-time. To address this, both the ODMG-93 standard, as described in ADF+93, and ObjectStore, as described in LLOW91 and OHMS92, place the burden of avoiding this problem on the user. Users of these query facilities are expected to include NULL-testing predicates in their queries in order to prevent such cases. If a dereference of a NULL pointer does occur in a query, it is viewed as an error and a run-time exception is raised. This makes queries more complex to specify and introduces ordering dependencies among the query's (possibly many) NULL tests and path predicates.

Thus there is a need in the art for improved methods of handling NULL pointers in SQL queries over object-oriented data.

SUMMARY OF THE INVENTION

To overcome the limitations in the prior art described above, and to overcome other limitations that will become apparent upon reading and understanding the present specification, the present invention discloses a method, apparatus, and article of manufacture for handling NULL values in SQL queries over object oriented data. A two-phase method is used to enable a query evaluator in a two-valued logic environment to properly handle occurrences of NULL values for predicates that involve subqueries, i.e., basic subquery predicates and/or quantified subquery predicates. For basic subquery predicates, negation reduction is performed by applying logical equivalence rules and inverting basic comparators (e.g., transforming < to >=) to eliminate NOTs. Then, transformations are employed for the resulting positive predicates to include NULL value testing, i.e., NULL protection. For quantified subquery predicates, in addition to performing negation reduction, quantified subqueries are converted into existential subqueries. In most cases, this yields a predicate that can be handled using NULL protection transformations for positive predicates. The exception (i.e., a "NOT EXISTS" resulting from the conversion step of a universal quantified subquery) is handled using NULL protection transformations for negative predicates. The evaluation of the NULL tested positive and negative predicates ensures that if a predicate has a NULL value, it is not included in the query result.

It is therefore an object of this invention to eliminate run-time exceptions in a two-valued logic query system where NULL values are not supported if NULL pointers are encountered in query predicates having subqueries.

It is a further object of this invention to eliminate the need for users to perform NULL-testing in a two-valued logic query system environment having NULL pointers.

It is a further object of this invention to enable a query engine running against a system based upon two-valued logic to process predicates having subqueries that may have NULL pointers.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
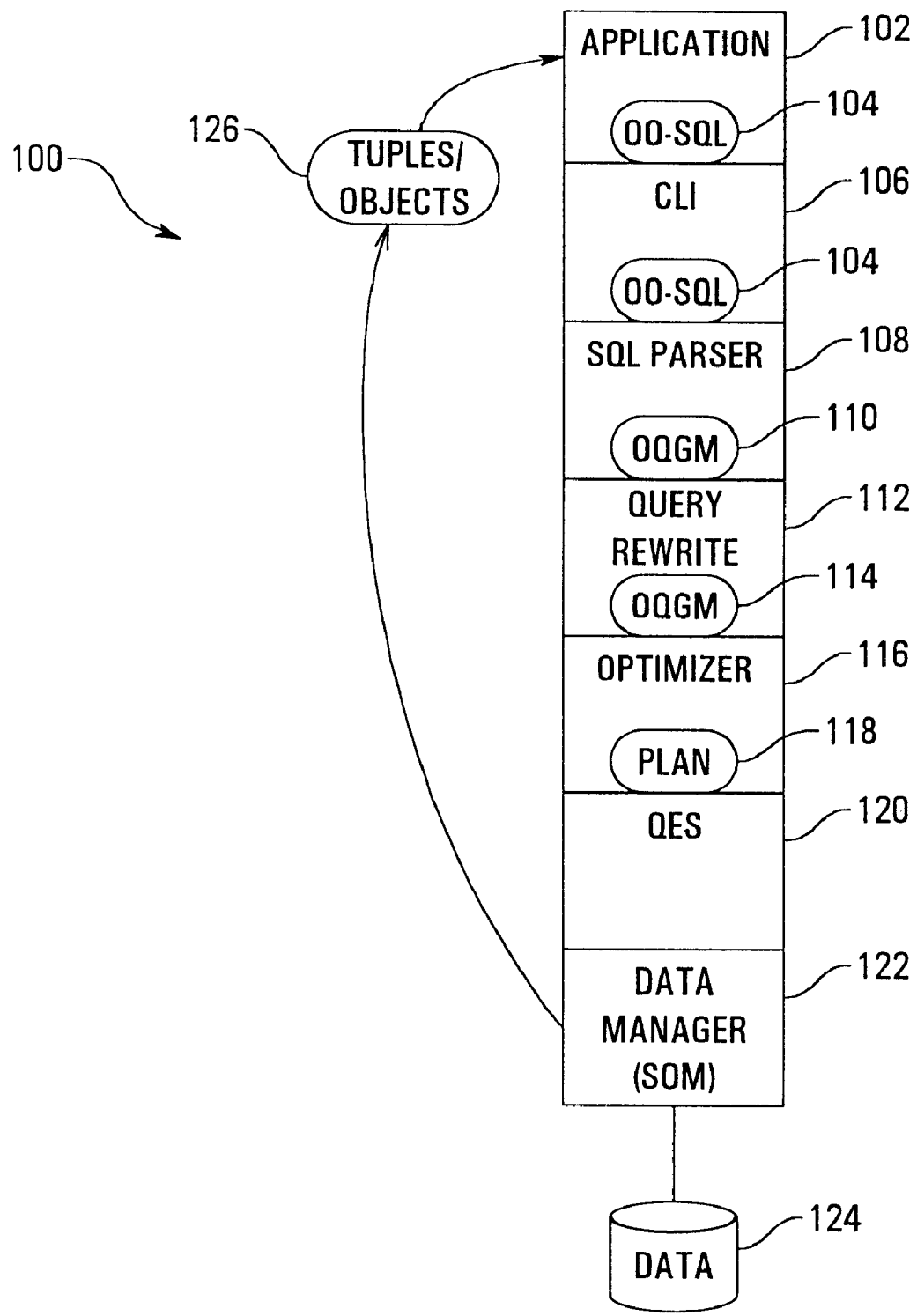
FIG. 1 illustrates an OO-SQL DMBS according to the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

A path expression p can be expressed as $q.m_1..m_2.., \ldots, ..m_n$ where q is a correlation name defined over a collection C, and $m_1$ is an attribute of the class of instances of C, and $m_i$ is an attribute of the class of $m_{i-1}$. An attribute $m_i$ can be a data member or a function member (method). A path expression evaluates to the value of the leaf of the expression. For example, in "e.address..zip", "address" is an attribute of the class empClass and "zip" is an attribute of the class Address. The expression "e.address.zip" returns the value of "zip".

A sample object-oriented database schema follows:

```
typedef struct Address
{
    char *street;
    char *city;
    char *zip;
};
class empClass :   public person
{ public:
    int            no;
    float          sal;
    Address        address;
    deptClass      *dept;
    person         *spouse;
    int            mgr;
};
class deptClass
{ public:
root
    int            no;
    char           name[20];
    Collection<empClass*> emps;
};
Collection<empClass*> *Emp; // Database root
Collection<deptClass*> *Dept; // Database
```

In the schema above, each instance of empClass has a "dept" attribute that is a pointer to an instance of deptClass. Consider a path expression that reaches an employee's department number through the "dept" attribute. If the "dept" attribute for a particular instance of empClass is a NULL pointer, then the path expression results in a NULL value for that instance of empClass. NULL values in predicates follow the same semantics as in SQL-based RDBMSs (where bindings for variables where the condition evaluates to UNKNOWN are not included in the result, and an "IS [NOT] NULL" predicate is provided to determine whether expressions are NULL).

The present invention handles NULL values in queries using tri-valued logic in a two-valued logic system. NULL values do not exist in the object-oriented data models manipulated by object-oriented SQL queries, but are introduced due to path expressions that can contain NULL pointers. The present invention can handle path expressions of any length in which a node might be a NULL pointer. This protects a simple, two-valued, query engine from abnormal termination when traversing a NULL pointer, and provides the correct interpretation of object-oriented SQL queries in the presence of such expressions. Moreover, the present invention handles predicates that include subqueries whose interpretation can be NULL. Also, the present invention handles the correct interpretation of the IS NOT NULL predicate for general path expressions.

To enable a two-valued query evaluator to properly handle occurrences of NULL values in basic path predicates (i.e., those without subqueries), an extended version of the basic GEM transformations are employed for positive and negative predicates called null protection.

In particular, the present invention applies query rewrite transformations on object-oriented SQL queries so that the rewritten query is amenable to the introduction of appropriate NULL-pointer checking predicates for two-valued logic environments. To enable a two-valued query evaluator to properly handle occurrences of NULL values in both simple predicates (i.e., those without subqueries) and subquery predicates (i.e., those within subqueries), a two phase transformation is performed. For both types of predicates, negation reduction is performed by applying DeMorgan's logical equivalence rules and inverting their basic comparators (e.g., transforming < to >=) to eliminate NOTS. Additionally, to handle subquery predicates, all quantified subqueries are transformed into existential subqueries. Then, for both types of predicates, transformations are employed to include NULL value checks.

ENVIRONMENT

An OO-SQL query engine 100 is described with reference to FIG. 1. A preferred embodiment has an implementation of the OO-SQL query engine 100 that runs on top of System Object Model (SOM), which is well known in the art as an object architecture. SOM is described fully in Christina Lau, *Object Oriented Programming Using SOM and DSOM*, Van Nostrand Reinhold, an International Thomson Publishing Company, 1994. In addition, the OO-SQL query engine 100 can run on top of an OODB system.

FIG. 1 presents the framework for the implementation which supports the integration of the OO-SQL query engine 100 with a user's applications 102. The application 102 issues OO-SQL queries 104 through a Call Level Interface (CLI) 106. The OO-SQL parser 108 parses the query and generates an internal representation of the query called a query graph, i.e. a data structure OQGM (object query graph model) 110. The OQGM 110 is passed to the query rewrite component 112, which applies transformations to optimize the query. This query rewrite component 112 employs standard relational query rewrite techniques that were developed for relational systems as well as the query rewrite transformations of this invention. The query rewrite transformations of this invention apply the negation reduction techniques as discussed herein. The rewrite phase component 112 outputs as its result a query graph 114 that is used by the optimizer 116. The optimizer 116 further optimizes the query by applying the null protection techniques discussed herein. Each query is then translated into an executable plan (QPL) 118. Once translated, the QPL 118 is passed to the Query Evaluation Subsystem (QES) 120, which runs it against SOM collections of objects 122, which can include objects stored in a database 124. Returned to the application 102 (which could also be a user interacting directly through an interface) is an ordered collection of tuples or objects 126.

Query results can include pointers to objects in stored collections 124. These pointers are simply virtual memory addresses in the application program 102, so they must be valid pointers in the application program 102 in order to be useable for further C++ based navigation and data manipulation.

Figure 2:
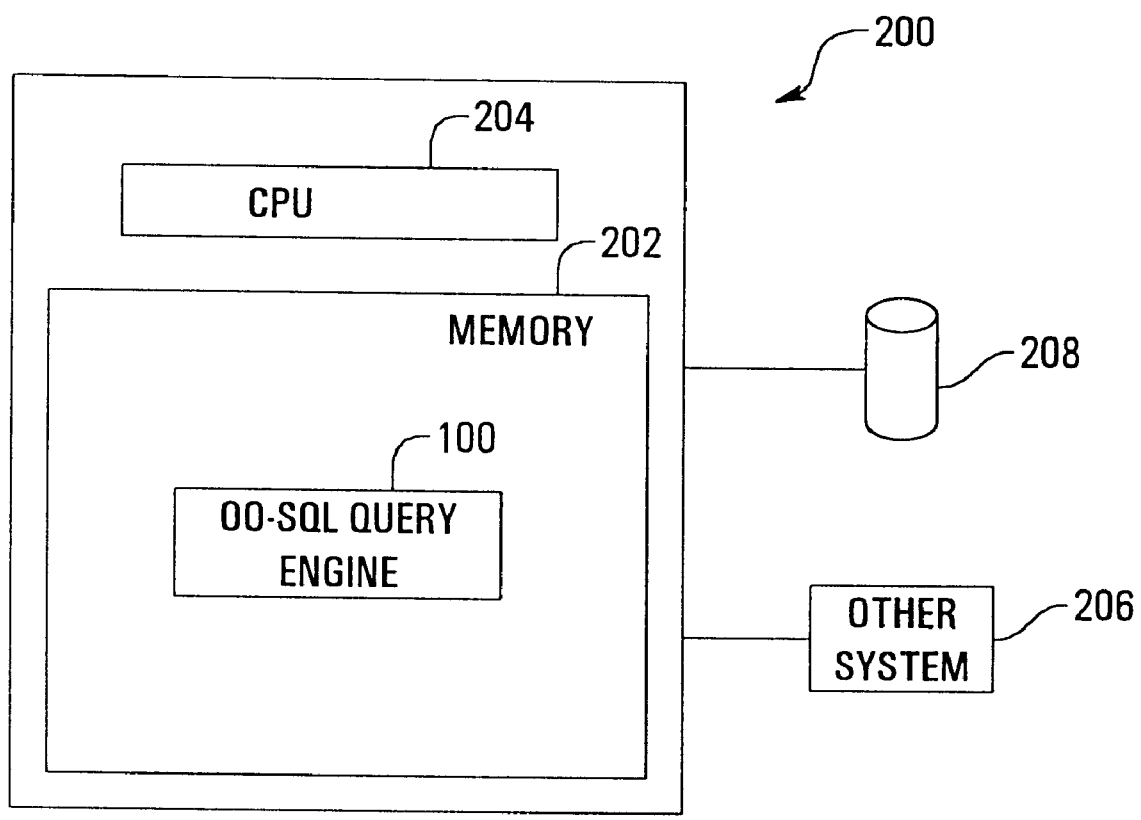
FIG. 2 illustrates a computer hardware environment according to the present invention.

FIG. 2 shows the context of the OO-SQL query engine 100 in a processing system 200 having memory 202 and at least one cpu 204. The system 200 could be connected to other systems 206 via a network. The application could be resident on any of the systems 200 or 206 in the network. Further, the OO-SQL query engine 100 could retrieve data from a data storage device 208 connected locally or remotely to the processing system.

Using the specification herein, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc.

Transmitting devices include, but are not limited to, the internet, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, cpus, memory/storage devices, communication links, communication/transmitting devices, servers, I/O devices, or any subcomponents or individual parts of one or more processing systems, including software, firmware, hardware or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

INTERPRETATION AND OPTIMIZATION

Handling NULL Values

The invention is applicable to predicates having subqueries and quantified subqueries. A predicate is a truth-valued function, i.e., a function that, given appropriate arguments, returns either TRUE, FALSE, or NULL (UNKNOWN). A quantified subquery includes a quantified predicate such as the universal predicate ALL and existential predicates such as ANY, SOME, and IN.

To handle object-oriented SQL, queries are transformed in two phases. The first phase performs negation reduction to simplify the treatment of NULL values including predicates that involve subqueries. Following this negation reduction phase, the second phase applies NULL protection transformations to guard the query engine against intermediate NULL pointer values. The negation reduction phase occurs at logical query rewrite time, and precedes query plan optimization. The NULL pointer protection phase occurs somewhat later, during plan optimization, as it requires predicates to have an ordered execution semantics.

The invention presented herein provides techniques for implementing tri-valued logic over two-valued systems to derive the correct interpretation of path expressions with NULL pointers and queries involving subquery predicates.

To properly handle NULLS in the context of path expressions, the technique of this invention extends the GEM transformations for NULLs in predicate expressions. To properly handle subqueries (including a basic predicate with a subquery and a quantified subquery), both types of subqueries are handled in a special fashion when being converted to two-valued logic since both types have specific semantics for their interpretation with respect to tri-valued logic. The invention is especially applicable for use with an underlying query evaluation engine that is itself capable of handling path expressions if, and only if, no intermediate pointer along the path is NULL, i.e., a two-valued query engine system.

The problem that this invention addresses is different than the problem of NULL values addressed in GEM in the following respect: The invention does not try to enrich the types of values that a column, say t.A of type integer, can have by selecting a specific value, say zero, to represent a NULL value instead of the value zero. The invention is concerned with the correct interpretation of path expressions in which a node might be a null pointer.

The problem which this invention overcomes has two aspects: 1) protecting a simple, two-valued, query engine from abnormal termination by traversing a NULL pointer, and 2) providing the correct interpretation of queries in Object-Oriented Systems (OOS) and Object-Oriented Database Systems (OODB), including those involving subquery predicates, in such an environment. These two aspects of the problem of handling NULL valued semantics in the context of queries in OOSs and OODBs are solved by this invention in the following ways. First, the invention provides a correct interpretation, by the query engine, of predicates with path expressions having NULL pointers by using NULL valued semantics. Second, the invention handles predicates that include subqueries whose interpretation can be NULL. Third, the invention provides a correct interpretation of the SQL "IS [NOT] NULL" predicate for the detection of NULL values in systems that do not directly support such a notion.

The present invention is incorporated into an OO query system that provides SQL-based query access to C++ programming language environments, Object-Oriented Systems (OOSs), and Object-Oriented Database Systems (OODBSs). The present invention is embodied in an object-oriented database query interface that provides an upward compatible extension to SQL-92, as discussed in *Database Language SQL ISO/IEC 9075:1992*, ISO_ANSI, 1991, [hereinafter referred to as "IS091"], which is incorporated by reference herein. The motivation for this approach is twofold. First, it enables programmers familiar with SQL to write object-oriented database queries without learning an entirely new language; they must simply learn about the object extensions. Second, it enables the many tools that have been built for relational systems to access object-oriented database data via interfaces such as open database connectivity (ODBC), *Microsoft Open Database Connectivity Software Development Kit*, Microsoft Programmer's Reference, 1992, [hereinafter referred to as "Mic92"], which is incorporated by reference herein.

Table 1, below, gives the interpretation of expressions in predicates.

TABLE 1

| P | Q | P AND Q | P OR Q |
|---|---|---------|--------|
| T | T | T | T |
| T | F | F | T |
| T | NULL | NULL | T |
| F | T | F | T |
| F | F | F | F |
| F | NULL | F | NULL |
| NULL | T | NULL | T |
| NULL | F | F | NULL |
| NULL | NULL | NULL | NULL |

Additionally, NOT (TRUE) is FALSE, NOT (FALSE) is TRUE, and NOT (NULL) is NULL. The SQL-92 "IS [NOT] NULL" predicate can be applied to a column of any type to determine if it has a NULL value, as discussed in [ISO91].

The IS NULL predicate is TRUE if the path expression has a node which is a NULL pointer. The predicate is FALSE otherwise, and inversely for IS NOT NULL.

SQL-92 includes predicates of the form: e r Q, and e r $\alpha$ Q in which e is an expression, r is a relational operator, $\alpha$ is a qualifier among {ANY, ALL} and Q is a subquery. Both have specific semantics for their interpretation with respect to tri-valued logic, and therefore require careful treatment when being converted to two-valued logic.

Managing NULL Values In Object-Oriented SQL Queries Using Two-Valued Logic

To handle object-oriented SQL, queries are transformed in two phases. The first phase is to use negation reduction to simplify the treatment of NULL values for predicates that involve subqueries. The purpose behind this simplification is that if negation is eliminated in predicates, then predicates that evaluate either to FALSE or to NULL can be treated similarly. (This is the case because object-oriented SQL, like SQL, only returns query results for those predicates that evaluate to TRUE.) Following this negation reduction phase, the second phase applies the NULL protection transformations to guard the query engine against intermediate NULL pointer values.

A two-phase method is used to enable a query evaluator in a two-valued logic environment to properly handle occurrences of NULL values for predicates that involve subqueries, i.e., basic subquery predicates and/or quantified subquery predicates. For basic subquery predicates, negation reduction is performed by applying logical equivalence rules and inverting basic comparators (e.g., transforming < to >=) to eliminate NOTS. Then, transformations are employed for the resulting positive predicates to include NULL value testing, i.e., NULL protection. For quantified subquery predicates, in addition to performing negation reduction, quantified subqueries are converted into existential subqueries. In most cases, this yields a predicate that can be handled using NULL protection transformations for positive predicates. The exception (i.e., a "NOT EXISTS" resulting from the conversion step of a universally quantified subquery) is handled using NULL protection transformations for negative predicates. The evaluation of the NULL tested positive and negative predicates ensures that if a predicate has a NULL value, it is not included in the query result.

A predicate with a subquery has the form e r Q, where e is an expression, r is a relational operator, and Q is a subquery that returns at most a single value. For example, the following query selects employees who have a higher salary than their manager:

```
select      *
from        Emp e
where       e.sal >     (select m.sal
                         from Emp m
                         where m.no = e.mgr);
```

For a given Employee "e", the subquery is computed and the comparison (e.sal>m.sal) is performed. The SQL interpretation of predicates with a subquery is NULL if either operand is NULL (e.sal or m.sal in the above example), or if the subquery returns an empty result.

A quantified subquery predicate is of the form e r $\alpha$ Q, where e is an expression, r is a relational operator, $\alpha$ is a qualifier among {ALL, ANY, SOME, IN}, and Q is a subquery. For example, the following query selects employees having the highest salary of employees in their department:

```
select      *
from        Emp e
where       e ... sal >= ALL    (select ... e2 ... sal
                                 from (e ... dept ... emps)
                                 e2);
```

For a given Employee "e", the subquery selects the salaries of all employees in "e's" department. The interpretation of this predicate is NULL if the specified relationship is not FALSE for any values returned by the subselect and at least one comparison is unknown because of a NULL value. The following query selects employees who have in their departments, other employees with the same name:

```
select      *
from        Emp e
where       e ... name = ANY    (select e2 ... name
                                 from (e ... dept ... emps) e2
                                 where e2 <> e);
```

The interpretation of this predicate is NULL if the specified relationship is not TRUE for any of the values returned by the subselect and at least one comparison is unknown because of a NULL value.

As shown above, the interpretation in OOSQL of basic predicates with subqueries, of an "ALL" quantified subquery and of an "ANY" quantified subquery, is enabled to be the same as the interpretation provided by SQL-92 even though OOSQL is based upon a two-valued logic system and SQL-92 provides for tri-valued logic. The invention presented herein handles queries with such subquery predicates.

As discussed above, a path expression p is of the form $q.m_1..m_2..,...,..M_n$ in which attributes $m_1, ..., m_{n-1}$ can be NULL pointers. To protect the query engine from abnormal termination due to dereferencing a NULL pointer, each attribute $m_1$ through $m_{n-1}$ along the path must be checked for NULL values before attempting to further resolve the path p. Doing this takes care of intermediate NULLs along paths.

Object-Oriented SQL Transformations

Figure 3:
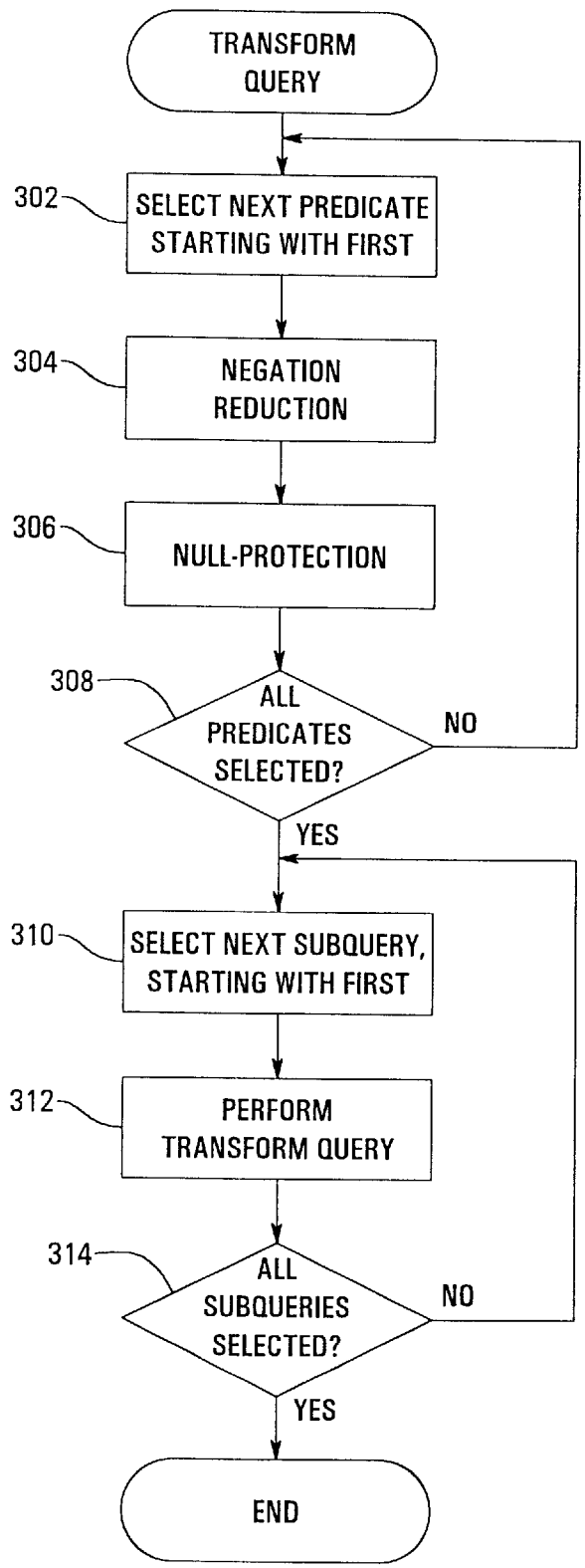
FIG. 3 is a flowchart illustrating the method of initializing and optimizing SQL queries over object-oriented data according to the present invention.

FIG. 3 is a flowchart illustrating the method of initializing and optimizing SQL queries over object-oriented data according to the present invention. In step 302, each predicate in a query is selected, starting with the first predicate. In step 304, the negation reduction is performed. To perform negation reduction, logical equivalence rules are applied to the query to eliminate negative predicates and to convert quantified subqueries into existential subqueries, as will be discussed in further detail below.

Once step 304 is completed, step 306 indicates that NULL protection is performed. Recall that a path expression resolves to the value of the leaf of the path expression, and that the correct interpretation of predicates is dictated by tri-valued logic. Predicates having path expressions are transformed as follows:

$p_1 \; r \; k$ $p_1 \; r \; p_2$ in which $p_i$ is a path expression, k is a constant, and r is a relational operator among $\{=, \neq, <, \leq, >, \geq\}$. Positive expressions are transformed as follows:

$P_1 \; r \; k \rightarrow q_1.m_1 \neq NULL$ and $q_1.m_1..m_2 \neq NULL$ and ... and $q_1.m_1.., \ldots , ..m_{n-1} \neq NULL$ and $q_1.m_1.., \ldots , ..m_n \; r \; k$ $p_1 \; r \; p_2 \rightarrow q_1.m_1 \neq NULL$ and $q_1.m_1..m_2 \neq NULL$ and ... and $q_1.m_1.., \ldots , ..m_{n-1} \neq NULL$ and $q_2.m_1 \neq NULL$ and $q_2.m_1..m_2 \neq NULL$ and ... and $q_2.m_1.., \ldots , ..m_{m-1} \neq NULL$ and $q_1.m_1.., \ldots , ..m_n \; r \; q_2.m_1.., \ldots , ..m_m$ Note that it is assumed that the last nodes $m_n$ in the path expression above are not pointer types.

Since any non-leaf node in a path expression can contain a NULL pointer, each node in a path expression must be checked for NULL values before proceeding to the successive one. For positive expressions, the NULL test ensures that bindings for predicates evaluating to NULL are not included in the result.

It should be noted that if an existential subquery of the form "not exists Q" is part of the original query, then it is treated as a positive predicate as described above. However, if the existential subquery "not exists Q" is a result of being converted from an "ALL" quantified subquery, then its predicates are treated according to the following formulas for negative predicates:

not $(P_1 \; r \; k) \rightarrow$ not $(q_1.m_1=NULL$ or $q_1.m_1..m_2=NULL$ or ... or $q_1.m_1.., \ldots , ..m_{n-1}=NULL$ or $q_1.m_1.., \ldots , ..m_n \; r \; k)$ not $(p_1 \; r \; p_2) \rightarrow$ not $(q_1.m_1=NULL$ or $q_1.m_1..m_2=NULL$ or ... or $q_1.m_1.., \ldots , ..m_{n-1}=NULL$ or $q_2.m_1=NULL$ or $q_2.m_1..m_2=NULL$ or ... or $q_2.m_1.., \ldots , ..m_{m-1}=NULL$ or $q_1.m_1.., \ldots , ..m_n \; r \; q_2.m_1.., \ldots , ..m_m)$ Note that it is assumed that the last nodes $m_n$ in the path expression above are not pointer types.

The NULL test ensures that bindings for predicates evaluating to NULL are not included in the result by returning TRUE if a NULL pointer is found. After reaching the scope of negation, it will become false.

As shown above for the positive predicates, a NULL testing predicate is applied to each node along the path expression with each NULL testing predicate being AND'ed together. The semantic of the IS NOT NULL is interpreted as being FALSE if the path expression has a node which is a NULL pointer, and it is interpreted as being TRUE if the path expression does not have a node which is a NULL pointer. Because each node and its NULL testing predicate are AND'ed together, if there is a NULL pointer present, or if the predicate expression evaluates to FALSE, then the whole predicate expression evaluates to FALSE. As such, for positive predicates, the NULL test ensures that bindings for predicates evaluating to NULL are not included in the result. Since bindings for predicates evaluating to FALSE are not included in the result, both a NULL value and a FALSE value are handled similarly.

As shown above for the negative predicate "not exist Q", a NULL testing predicate is applied to each node along the path expression with each NULL testing predicate being OR'ed together. The semantic of the IS NULL is interpreted as being TRUE if the path expression has a node which is a NULL pointer, and it is interpreted as being FALSE if the path expression does not have a node which is a NULL pointer. Because each node and its NULL testing predicate are OR'ed together, if there is a NULL pointer present, then the whole predicate expression evaluates to TRUE. After the scope of negation is applied, the expression evaluates to FALSE thereby ensuring that bindings for predicates having a NULL pointer are not included in the result.

By applying the NULL transformations and interpreting the semantics as described above with respect to positive and negative predicates, the query can be processed, in a two-valued logic query system that does not support NULL values and in an environment that has NULL pointers, without an abnormal termination as a result of a traversal of a NULL pointer with a predicate having a subquery.

NULL tests are added to all of the positive path predicates in the transformed predicate tree. As for negative predicates, the only negative predicates that survive the negation reduction process are predicates of the form "not exists Q." These must be treated carefully because a positive (universal) predicate is transformed into a negative (existential) one. Those that were generated by the transformations in Table 5, which convert universally quantified subqueries into negative existential subqueries, must be handled as a special case in order to produce the correct NULL semantics. It should be noted that if a "not exists Q" appears in the original query, it is handled as a positive predicate. In the case of a "not exists Q" subquery that was introduced by transformations in Table 5, the newly created predicate (a $r^{-1} \; x_1$) was pushed into the body of Q. In the predicate, $r^{-1}$ is the inverse comparator for r, and $x_1$ is the first and only projection element. This predicate requires particular attention, as it must remain in the scope of negation with respect to NULL testing predicates. These are the only predicates to which the path transformations for negative predicates are applied. Other negative existential subqueries are handled similarly to positive ones (i.e., their predicates are considered to be positive with respect to the introduction of NULL testing predicates). For positive (universal) predicates that are transformed into negative (existential) predicates, the resulting negative existential subquery must return FALSE if the universal predicate is either FALSE or UNKNOWN. It must therefore return FALSE if (i) the specified comparison is not FALSE for any values returned by the original subquery and (ii) at least one comparison is unknown because of a NULL value. The first case is handled by the inverse predicate which is added to the negative existential subquery; this detects any bindings for which the comparison fails. The second case detects any NULL values, which cause at least one comparison to be UNKNOWN due to a NULL value. This will be clarified in the example below.

Step 308 is a decision step determining whether all of the predicates have been selected. When all of the predicates have not been selected, then the next predicate is selected for negation reduction and NULL transformation. In step 310, the next subquery is selected, starting with the first subquery. In step 312, the transform query routine is performed on the subquery. This ensures that the predicates in subqueries have been properly handled. Step 314 is a decision step that determines whether all of the subqueries have been selected. When all of the subqueries have not been selected, then the next subquery is selected and transform query is performed on it.

Figure 4:
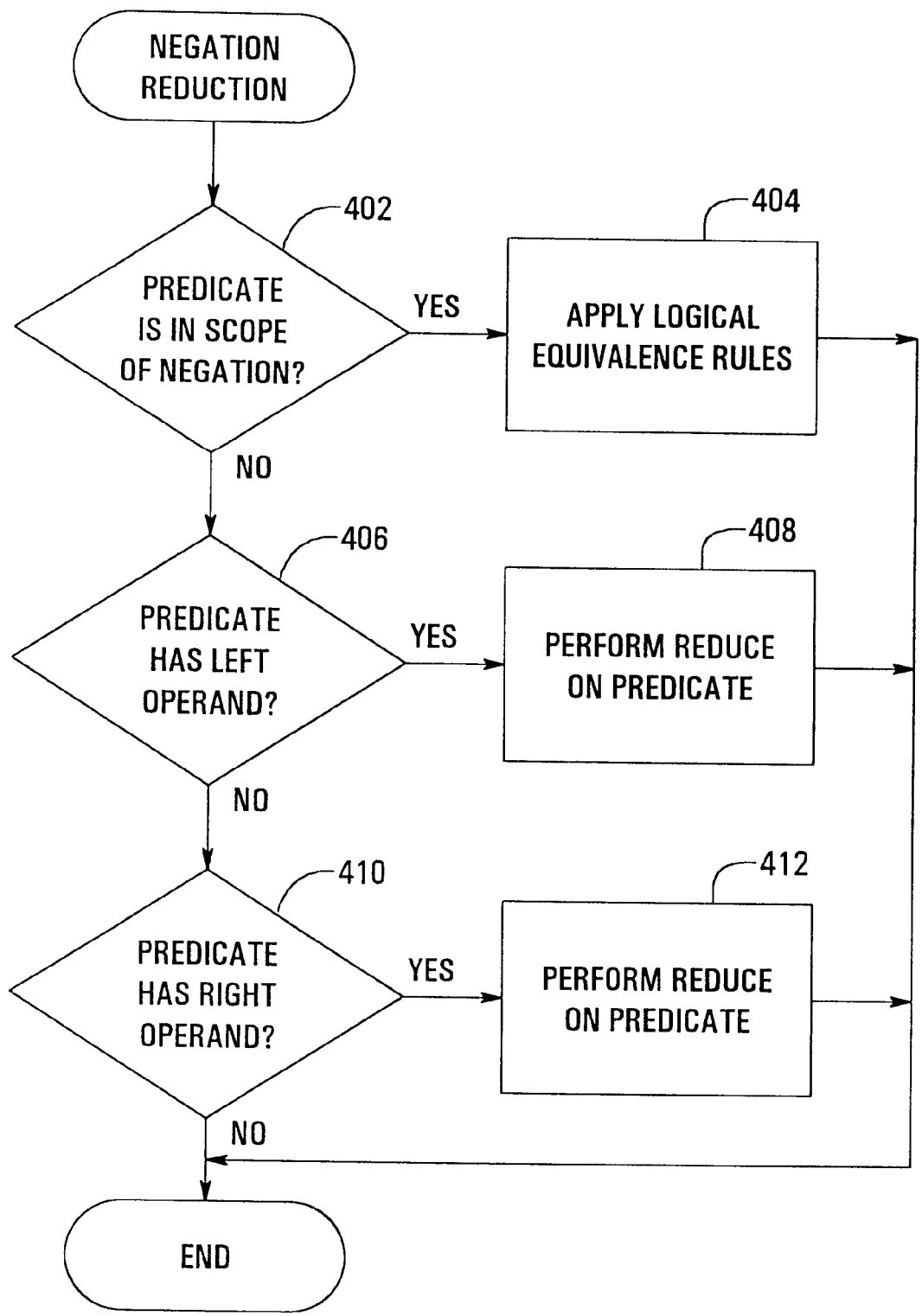
FIG. 4 is a flowchart illustrating the additional steps required to perform negation reduction according to the present invention.

FIG. 4 is a flowchart further illustrating additional detail of the steps required to perform negation reduction (step 304 of FIG. 3) according to the present invention. Step 402 is a decision step that determines whether a predicate is in the scope of negation. In step 404, when the predicate is in the scope of negation, logical equivalence rules are applied to progressively push negation from the root of a predicate tree down to the leaves of the predicate tree.

In particular, first logical equivalence rules are applied for negation reduction for predicate trees, as illustrated in Table 2 below.

TABLE 2

| not (not (A)) | A |
| not (A or B) | (not (A) and not (B)) |
| not (A and B) | (not (A) or not (B)) |

Next, logical equivalence rules are applied for negation reduction of simple predicates, as illustrated in Table 3 below.

TABLE 3

| not (a = b) | a ≠ b |
| not (a ≠ b) | a = b |
| not (a > b) | a ≤ b |
| not (a ≥ b) | a < b |
| not (a < b) | a ≥ b |
| not (a ≤ b) | a > b |
| not (a like b) | a not like b |
| not (a not like b) | a like b |
| not (a IS NULL) | a IS NOT NULL |
| not (a IS NOT NULL b) | a IS NULL |

Then, logical equivalence rules are applied for negation reduction for quantified subqueries, as illustrated in Table 4 below.

TABLE 4

| not (a = ANY Q) | a ≠ ALL Q |
| not (a ≠ ANY Q) | a = ALL Q |
| not (a > ANY Q) | a ≤ ALL Q |
| not (a ≥ ANY Q) | a < ALL Q |
| not (a < Q) | a ≥ ALL Q |
| not (a ≤ ANY Q) | a > ALL Q |
| not (a = ALL Q) | a ≠ ANY Q |
| not (a ≠ ALL Q) | a = ANY Q |
| not (a > ALL Q) | a ≤ ANY Q |
| not (a ≥ ALL Q) | a < ANY Q |
| not (a < ALL Q) | a ≥ ANY Q |
| not (a ≤ ALL Q) | a > ANY Q |

The last step involves applying logical equivalence rules to convert quantified subqueries into existential subqueries, as illustrated in Table 5 below. Note that $x_1$ stands for the first (and only) projection element in the subquery Q.

TABLE 5

| a = ANY Q | exists (. . . and a = $x_1$) |
| a ≠ ANY Q | exists (. . . and a ≠ $x_1$) |
| a > ANY Q | exists (. . . and a > $x_1$) |
| a ≥ ANY Q | exists (. . . and a ≥ $x_1$) |
| a < ANY Q | exists (. . . and a < $x_1$) |
| a ≤ ANY Q | exists (. . . and a ≤ $x_1$) |
| a = ALL Q | not exists (. . . and a ≠ $x_1$) |
| a ≠ ALL Q | not exists (. . . and a = $x_1$) |
| a > ALL Q | not exists (. . . and a ≤ $x_1$) |
| a ≥ ALL Q | not exists (. . . and a < $x_1$) |
| a < ALL Q | not exists (. . . and a ≥ $x_1$) |
| a ≤ ALL Q | not exists (. . . and a > $x_1$) |

These transformations push the quantified predicate into the body of the subquery in order to convert the subquery from a quantified subquery into an existential subquery. A predicate of the form: "e r ANY (select $x_1$ . . . " generates a newly created predicate of the form "e r $x_1$", which is then AND'ed into the list of conjuncts in the existential subquery. Similarly, a predicate of the form: "e r ALL (select $x_1$ . . . )" generates a newly created predicate of the form "e $r^{-1}$ $x_1$" (where $r^{-1}$ is the inverse comparator for r) which is then AND'ed into the existential subquery's list of conjuncts; in this case, the resulting existential subquery itself is negative.

The details of the transformed existential subquery vary slightly from case to case. If the original subquery Q is not an aggregate form (i.e., Q has no aggregate function in its projection element and no group-by or having-clause), then the newly created predicate is AND'ed into the list of conjuncts in the existential subquery's where-clause. Otherwise, the newly created predicate is AND'ed into the having-clause (creating one if Q previously had no having-clause).

Continuing with FIG. 4, step 406 is a decision step that determines whether the predicate has a left operand. In step 408, when the predicate has a left operand, the negation reduction routine is performed on the predicate and its left operand. Step 410 is a decision step that determines whether the predicate has a right operand. In step 410, when the predicate has a right operand, the negation reduction routine is performed on the predicate and its right operand.

An Illustrative Example

In the following example, the query selects employees who don't have any spouses with the same name as their own spouse in their departments.

```
select      *
from        Emp e
where       not      (e.spouse. .name = any (select
                      e1.spouse. .name from (e.dept. .emps)
                      e1 where e <> e1))
```

The transformations applied to this initial query are now detailed.

```
1.  select   *
    from     Emp e
    where    e.spouse. .name <> all (select
             e1.spouse. .name from (e.dept. .emps) e1
             where e <> e1))
2.  select   *
    from     Emp e
    where    not exists (select 1 from (e.dept. .emps)
             e1
             where e <> e1 and e.spouse. .name =
             e1.spouse. .name)
3.  select   *
    from     Emp e
    where    not exists (select 1 from (e.dept. .emps)
             e1
             where (e <> e1 and
                (espouse == NULL or
                e1.spouse == NULL or
                e.spouse. .name =
                e1.spouse. .name)))
```

NULL values can appear in the following three places in the example query: (i) if "e.spouse" is a NULL pointer in "e.spouse..name", (ii) if "e1.spouse" is a NULL pointer in "e1.spouse..name", and (iii) if "e.dept" is a NULL pointer in "e.dept. . emps". Assume, in this example, that "name" is a character array and cannot be NULL. The first transformation eliminates negation by transforming the "ANY" quantified predicate into an "ALL" quantified predicate, and inverting the comparison operator. The second transformation converts the quantified predicate into a negative existential subquery by introducing a new predicate into the body of the subquery. The newly formed predicate is "e.spouse..name"="e1.spouse.name". Note that in the absence of NULL values, the negative existential subquery is equivalent to the "ALL" quantified predicate. The final transformation, which is actually performed later (during plan optimization), adds the NULL testing predicates that are required to implement the correct semantics of the query in the presence of NULL values (i.e., e.spouse == NULL or e1.spouse == NULL or . . . ). If "dept" in "e.dept.emps" is a NULL pointer, the interpretation of "e1" is the empty set.

The Complete Method

The transformations applied to an object-oriented SQL query to handle NULL values using a two-valued logic systems are presented in pseudocode below.

```
negation_reduction (q subquery)
begin
    for each conjunct p in q do
    begin
        reduce (p); null_protection (p);
    end
    for each subquery qi in q do
    begin
        negation_reduction (qi);
    end
end
reduce (p predicate)
begin
    if (p is in the scope of negation) then
    begin
        if (Table 2 transformations can be applied to
            p) then
            apply Table 2 transformations to p;
        else if (Table 3 transformations can be
            applied to p) then
            apply Table 3 transformations to p;
            else if (Table 4 transformations can be
                applied to p) then
                apply Table 4 transformations
                    to p;
            if (Table 5 transformations can be
                applied to p) then
                apply Table 5 transformations to p;
    end
    if (p is a predicate that has a left operand)
        then
        reduce (left operand (p));
    if (p is a predicate that has a right operand)
        then
        reduce (right operand (p));
end
null_protection (predicate p)
begin
    if (p is of the form q <relop> k) then
        if (p is not in the scope of negation) then
            p := q.m₁ <> NULL and . . . and
            q.m₁ . . ., . . ., . . m_{n-1} <> NULL and
            q.m_i . . ., . . ., . . m_n <relop> k;
        else
            p := q.m₁ = NULL or . . . or
            q.m₁ . . ., . . ., . . m_{n-1} = NULL or
            q.m₁ . . ., . . ., . . m_n <relop> k;
    else if (p is of the form q1 <relop> q2) then
        if (p is not in the scope of negation) then
            p := q₁.m₁ <> NULL and . . . and
            q₁.m₁ . . ., . . ., . . m_{n-1} <> NULL and
            q₂.m₁ <> NULL and . . . and
            q₂.m₁ . . ., . . ., . . m_{m-1} <> NULL and
            q₁.m₁ . . ., . . ., . . m_n <relop>
            q₂.m₁ . . ., . . ., . . m_m;
        else
            p := q₁.m₁ = NULL or . . . or
            q₁.m₁ . . ., . . ., . . m_{n-1} = NULL or
            q₂.m₁ = NULL or . . . or q₂.m₁ . . ., . . ., . . m_{m-1}
            = NULL or q₁.m₁ . . ., . . ., . . m_n <relop>
            q₂.m₁ . . ., . . ., . . m_m;
    else
    begin
        if (p is a predicate that has a left operand)
            then
            null_protection (left operand (p));
        if (p is a predicate that has a right
            operand) then
            null_protection (right operand (p));
    end
end
```
© Copyright 1997 IBM Corporation.

The recursive negation_reduction procedure accepts a single parameter that is a subquery. The initial query is treated as a subquery since it is passed as a parameter to this function. The negation_reduction procedure iterates through each AND'ed predicate in the query, and calls the reduce procedure to apply negation reduction on each predicate. For example, the predicate expression e.sal>100 and not (e.no <> 10) would generate two iterations. The first for predicate e.sal>100 and the second for predicate not (e.no <> 10). For a given subquery Q, once all predicates have been reduced, the method processes each subquery contained within Q by recursively calling negation reduction for each one. Once the reduce procedure has transformed a predicate p, the null_protection procedure is applied to the predicate p to introduce the NULL pointer testing predicates to ensure i) that path expression traversal does not extend beyond NULL pointers, and ii) the correct interpretation of predicates that include them. The null_protection procedure performs the null_protection transformations described under the heading "Object-Oriented SQL Transformations". Subqueries contained within subqueries might also have predicates scoped by negation that need to be reduced in order to be interpreted correctly with respect to NULL values.

The reduce procedure accepts a predicate p, over which it attempts to apply the transformations given in Tables 2 through 5. The reduce procedure handles predicates that are scoped by negation. Even if a predicate is not itself scoped by negation, it might include other predicates that are. The reduce procedure also includes recursive calls to the reduce procedure that handle operands of predicates that are also predicates. For example, calling reduce with the predicate e.sal>100 or not (e.no <> 10), would cause two recursive calls to the reduce procedure. The transformations performed using Table 2 push negation into the leaves of predicate trees. These leaves are further reduced by the transformations performed by Tables 3 to 5. However, the transformations performed using Table 4 produce subqueries that are applicable for further transformations using Table 5 (e.g., a negated "ALL" subquery is transformed into an "ANY" subquery form using Table 4 transformations, and then transformed into an "exists" subquery using Table 5 transformations).

The IS [NOT] NULL Predicate

In SQL-92, discussed in ISO91, the "IS NULL" predicate, and it's negation, the "IS NOT NULL" predicate are used to test whether a column contains, or does not contain, a NULL value. The following is an interpretation of these predicates in a system that doesn't directly support such a notion.

The truth value of an expression p IS [NOT] NULL, where p is a path expression, is determined using the approach presented under the heading "Object-Oriented SQL Transformations", and is implemented using a method that is similar to the null_protection method. For path expressions p, where the leaf of the expression is not a pointer type, the transformations are as follows:

p IS NOT NULL→q.$m_1$≠NULL and q.$m_1..m_2$≠NULL and ... and q.$m_1$.., ... , ..$m_{n-1}$≠NULL p IS NULL→q.$m_1$=NULL or q.$m_1..m_2$=NULL or ... or q.$m_1$.., ... , ..$m_{n-1}$=NULL Path expressions that are pointers types have an additional test for the leaf node as follows:

p IS NOT NULL→q.$m_1$≠NULL and q.$m_1..m_2$≠NULL and ... and q.$m_1$.., ... , ..$m_{n-1}$≠NULL and q.$m_1$.., ... , ..$M_n$≠NULL p IS NULL→q.$m_1$=NULL or q.$m_1..m_2$=NULL or ... or q.$m_1$.., ... , ..$m_{n-1}$=NULL or q.$m_1$.., ... , ..$m_n$=NULL Note that it is assumed that the last nodes $m_n$ in the path expression are not pointer types.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of handling null values in a query having a subquery, the query being performed by a computer to retrieve object-oriented data from a database stored in an electronic storage device connected to the computer, the method comprising the steps of:

(a) iteratively eliminating, in the computer, negation in each predicate of the query by applying logical equivalence rules; and (b) iteratively performing, in the computer, null protection on each predicate of the query after eliminating negation, to ensure that null values are checked when attempting to retrieve the object-oriented data from the electronic storage device coupled to the computer within a two-valued logic environment.

2. The method of claim 1, wherein the query comprises quantified subqueries and wherein step (a) further comprises the step of applying logical equivalence rules to eliminate negation in predicates involving the quantified subqueries.

3. The method of claim 1, wherein the query comprises quantified subqueries and wherein step (a) further comprises the step of applying logical equivalence rules to transform the quantified subqueries into existential subqueries.

4. The method of claim 1, wherein step (b) further comprises the step of, when the predicate is a positive predicate, performing null protection transformations for the positive predicate.

5. The method of claim 1, wherein step (b) further comprises the step of, when the predicate is a negative predicate, performing null protection transformations for the negative predicate.

6. An apparatus for handling null values in a query having a subquery, comprising:

a computer with an electronic storage device connected thereto, the electronic storage device storing object-oriented data;

means for executing the query in the computer to retrieve the object-oriented data from the electronic storage device;

means, performed by the computer, for iteratively eliminating negation in each predicate of the query by applying logical equivalence rules; and means, performed by the computer, for iteratively performing null protection on each predicate of the query after eliminating negation, to ensure that null values are checked when attempting to retrieve the object-oriented data from the electronic storage device coupled to the computer within a two-valued logic environment.

7. The apparatus of claim 6, wherein the means for iteratively eliminating further comprise means for applying logical equivalence rules to eliminate negation in each predicate in the query.

8. The apparatus of claim 6, wherein the query comprises quantified subqueries and wherein the means for iteratively eliminating further comprise means for applying logical equivalence rules to eliminate negation in the quantified subqueries.

9. The apparatus of claim 6, wherein the query comprises quantified subqueries and wherein the means for iteratively eliminating further comprise means for applying logical equivalence rules to transform the quantified subqueries into existential subqueries.

10. The apparatus of claim 6, wherein the means for iteratively performing further comprise means for, when the predicate is a positive predicate, performing null protection transformations for the positive predicate.

11. The apparatus of claim 6, wherein the means for iteratively performing further comprise means for performing null protection transformations for the negative predicate, when the predicate is a negative predicate.

12. A program storage device, readable by a computer, tangibly embodying one or more programs of instructions executable by the computer to perform method steps for handling null values in a query having a subquery that is performed by the computer to retrieve object-oriented data from an electronic storage device connected to the computer, the method comprising the steps of:

iteratively eliminating, in the computer, negation in each predicate of the query by applying logical equivalence rules; and iteratively performing, in the computer, null protection on each predicate of the query after eliminating negation, to ensure that null values are checked when attempting to retrieve object-oriented data from the electronic storage device coupled to the computer within a two-valued logic environment.

13. The program storage device of claim 12, wherein the query comprises quantified subqueries and wherein the iteratively eliminating step further comprises the step of applying logical equivalence rules to eliminate negation in predicates involving the quantified subqueries.

14. The program storage device of claim 12, wherein the query comprises quantified subqueries and wherein the iteratively eliminating step further comprises the step of applying logical equivalence rules to transform the quantified subqueries into existential subqueries.

15. The program storage device of claim 12, wherein the iteratively performing step further comprises the step of performing null protection transformations for the positive predicate, when the predicate is a positive predicate.

16. The program storage device of claim 12, wherein the iteratively performing step further comprises the step of performing null protection transformations for the negative predicate, when the predicate is a negative predicate.

17. A method for processing a query in a computer system, comprising the steps of:

providing, in a two-valued logic system where NULL values are unsupported, a tri-valued logic interpretation, by a query engine, of predicates involving subqueries having a capability to have NULL pointers; and protecting the query engine processing the query from abnormal termination due to dereferencing one of the NULL pointers.

18. A method for processing queries in a computer system, comprising the steps of:

processing, by a two-valued logic system which is not supportive of NULL values in an environment having NULL pointers, a predicate having a subquery by transforming the predicate by:

employing a technique to handle each occurrence of a negative predicate, if any, as a positive predicate;

transforming a quantified subquery, if any, into an existential form;

applying null tests, by the query system, to each resulting predicate; and interpreting the semantics of the NULL tested resulting predicate such that a presence of a NULL pointer or a NULL value is handled in a same way as if the predicate evaluated to False by not returning a result;

wherein the two-valued logic system simulates tri-valued logic and the query system does not terminate abnormally if a NULL pointer is traversed.

19. The method of claim 18, wherein the step of employing further comprises applying equivalence rules to progressively push negation from the root to the leaves of the predicate and to reduce the breadth of negation.

20. The method of claim 18, wherein the step of transforming further comprises pushing the quantified predicate into a body of the subquery.

21. The method of claim 20, wherein the predicate having a form "e r ANY (select $x_1$ . . . " generates a created predicate of the form "e r $x_1$"; and further comprising AND'ing the created predicate into a list of conjuncts in the existential subquery; wherein e is an expression, r is a relational operator among $\{=, \neq, <, \leq, >, \geq\}$, and $x_1$ is a projection element.

22. The method of claim 20, wherein the predicate having a form "e r ALL (select $x_1$ . . . " generates a created predicate of the form "e $r^{-1}$ $x_1$"; and further comprising AND'ing the created predicate into a list of conjuncts in the existential subquery; wherein e is an expression, r is a relational operator among $\{=, \neq, <, \leq, >, \geq\}$, $x_1$ is a projection element, and $r^{-1}$ is the inverse comparator for r.

23. The method of claim 20 or 21, wherein if the subquery does not have an aggregate function in its projection element and there is no group-by or having-clause, then the created predicate is AND'ed into the list of conjuncts in a where-clause of the existential subquery.

24. The method of claim 20 or 21, wherein if the subquery has an aggregate function in its projection element, then the created predicate is AND'ed into a having-clause.

25. The method of claim 21, wherein the created predicate remains in a scope of negation during the application of the null protection transformations, and wherein the step of applying null protection transformations further comprises applying the following transformations for the created predicate:

(i) transforming a negative expression "not ($p_1$ r k)" as:
not ($p_1$ r k)→not ($q_1.m_1$=NULL or $q_1.m_1..m_2$=NULL or . . . or $q_1.m_1..,$ . . . , $..m_{n-1}$=NULL or $q_1.m_1..,$ . . . , $..m_n$ r k); and (ii) transforming a negative expression "not ($p_1$ r $p_2$)" as:
not ($p_1$ r $p_2$)→not ($q_1.m_1$=NULL or $q_1.m_1..m_2$=NULL or . . . or $q_1.m_1..,$ . . . , $..m_{n-1}$=NULL or $q_2.m_1$=NULL or $q_2.m_1..m_2$=NULL or . . . or $q_2.m_1..,$ . . . , $..m_{m-1}$=NULL or $q_1.m_1..,$ . . . , $..m_n$ r $q_2.m_1..,$ . . . , $..m_m$), wherein:

$p_1$ is a path expression of the form $q_1.m_1..m_2..,$ . . . , $..m_n$ in which attributes $m_1$, . . . , $m_{n-1}$ can be NULL pointers, k is a constant, and $p_2$ is a path expression of the form $q_2.m_1..m_2..,$ . . . , $..m_n$ where $m_1$, . . . , $m_{n-1}$ are attributes that can be NULL pointers.

26. A method for processing a query having a predicate with a subquery in a computer system, comprising the steps of:

using a two-valued logic system to process the query, the query being capable of having NULL values;

reducing each predicate in the query from a negative predicate to a logically equivalent positive predicate;

applying NULL pointer testing predicates to each positive predicate to ensure that path expression traversal does not extend beyond NULL pointers; and interpreting the NULL tested positive predicates that include NULL pointers similarly to a False value of the predicate by not being included in the result.

27. The method of claim 26, further comprising:

if one of the each predicates is a quantified subquery predicate, converting the quantified subquery predicate into an existential subquery predicate; and if a resulting converted existential subquery is a form of "NOT EXIST", applying a NULL protection.

28. A method for processing a query in a computer system, comprising the steps of:

transforming a predicate having a subquery into a logically equivalent predicate;

checking for nullness, in query systems that support subqueries and in an environment where NULL values are unsupported, each attribute ($m_1$ through $m_n$) along each path expression p having a form $q.m_1..m_2..,$ . . . , $..m_n$ where $m_1$, . . . , $m_n$ can be NULL pointers within the transformed predicate;

interpretating, by a two-valued logic system, the check for nullness of the transformed predicate in a way that supports tri-valued logic; and continuing to resolve the path after the check for nullness; wherein a presence of a NULL pointer in the transformed predicate is handled in a same way as a FALSE value of the predicate having a subquery by not returning a result and the query engine processing the query is protected from abnormal termination due to dereferencing the NULL pointer.

29. A method for processing a query in a computer system, comprising the steps of:

applying, in an environment having NULL pointers and where NULL values are unsupported, an IS NULL predicate to a path expression in the query; and interpreting a semantic of the IS NULL as being TRUE if the path expression has a node which is a NULL pointer.

30. A method for processing a query in a computer system, comprising the steps of:

applying, in an environment having NULL pointers and where NULL values are unsupported, an IS NULL predicate to a path expression in the query; and interpreting a semantic of the IS NULL as being FALSE if the path expression does not have a node which is a NULL pointer.

31. A method for processing a query in a computer system, comprising the steps of:

applying, in an environment having NULL pointers and where NULL values are unsupported, an IS NOT NULL predicate to a path expression in the query; and interpreting a semantic of the IS NOT NULL as being FALSE if the path expression has a node which is a NULL pointer.

32. A method for processing a query in a computer system, comprising the steps of:

applying, in an environment having NULL pointers and where NULL values are unsupported, an IS NOT NULL predicate to a path expression in the query; and interpreting a semantic of the IS NOT NULL as being TRUE if the path expression does not have a node which is a NULL pointer.

33. The method of claims 29 or 31, further comprising the step of continuing to process the query without an abnormal termination of a query engine as a result of a traversal of the NULL pointer.

34. The method of claims 29, 30, 31, or 32, wherein the environment is an object-oriented database environment.

35. The method of claims 29, 30, 31, or 32, wherein the environment is an object-oriented system.

36. A method for processing a query in a computer system, comprising the steps of:

processing the query, in an environment where NULL values are unsupported, the query having a basic predicate with a subquery; and interpreting the predicate as NULL if an operand is NULL or if the subquery returns an empty result.

37. A method for processing a query in a computer system, comprising the steps of:

processing the query, in an environment where NULL values are unsupported, the query having a predicate with a universal quantified subquery; and interpreting the predicate as NULL if a relationship is not FALSE for any values returned by the subquery and at least one comparison is unknown because of a NULL value.

38. A method for processing a query in a computer system, comprising the steps of:

processing the query, in an environment where NULL values are unsupported, having a predicate with an existential quantified subquery; and interpreting the predicate as NULL if a specified relationship is not TRUE for any values returned by the subquery and at least one comparison is unknown because of a NULL value.

39. A method for processing queries in a computer system, comprising the steps of:

processing, in an environment where NULL values are unsupported, a predicate having a path expression by:
(a) transforming each occurrence, if any, of a negative predicate into a positive predicate; and
(b) applying null protection transformations to each positive predicate by:
<(i) transforming a positive expression $p_1$ r k as $p_1$ r k→$q_1.m_1 \neq$NULL and $q_1.m_1..m_2 \neq$NULL and . . . and $q_1.m_1.., \ldots , ..m_{n-1} \neq$NULL and $q_1.m_1.., \ldots , ..m_n$ r k; and
(ii) transforming a positive expression $p_1$ r $p_2$ as $p_1$ r $p_2$→$q_1.m_1 \neq$NULL and $q_1.m_1..m_2 \neq$NULL and . . . and $q_1.m_1.., \ldots , ..m_{n-1} \neq$NULL and $q_2.m_1..m_2 \neq$NULL and $q_2.m_1..m_2 \neq$NULL and . . . and $q_2.m_1.., \ldots , ..m_{m-1} \neq$NULL and $q_1.m_1.., \ldots , ..m_n$ r $q_2.m_1.., \ldots , ..m_m$, wherein:
$p_1$ is a path expression of the form $q_1.m_1..m_2.., \ldots , ..m_n$ in which attributes $m_1, \ldots , m_{n-1}$ can be NULL pointers,
r is a relational operator among $\{=, \neq, <, \leq, >, \geq\}$,
k is a constant, and
$p_2$ is a path expression of the form $q_2.m_1..m_2.., \ldots , ..m_n$ where $m_1, \ldots ,m_{n-1}$ are attributes that can be NULL pointers.

40. A method for processing queries in a computer system, comprising the steps of:

processing, in an environment where NULL values are unsupported, a predicate having a subquery by:
(a) employing a technique to handle each occurrence, if any, of a negative predicate as a positive predicate;
(b) converting quantified subqueries into existential subqueries and pushing a created predicate into a body of the subquery;
(c) applying null protection transformations to each resulting predicate, except a "not exists Q" resulting from the conversion step (b), by:
(i) transforming an expression $p_1$ r k as $p_1$ r k→$q_1.m_1 \neq$NULL and $q_1.m_1..m_2 \neq$NULL and . . . and $q_1.m_1.., \ldots , ..m_{n-1} \neq$NULL and $q_1.m_1.., \ldots , ..m_n$ r k;
(ii) transforming an expression $p_1$ r $p_2$ as $p_1$ r $p_2$→$q_1.m_1 \neq$NULL and $q_1.m_1..m_2 \neq$NULL and . . . and $q_1.m_1.., \ldots , ..m_n \neq$NULL and $q_2.m_1 \neq$NULL and $q_2.m_1..m_2 \neq$NULL and . . . and $q_2.m_1.., \ldots , ..m_{m-1} \neq$NULL and $q_1.m_1.., \ldots , ..m_n$ r $q_2.m_1.., \ldots , ..m_m$; and
(d) applying a following applicable null protection transformation to a predicate, if any, having the form "not exists Q", if the form "not exists Q" is a result of the conversion of quantified subqueries into existential subqueries of step (b):
(i) ($p_1$ r k)→($q_1.m_1$=NULL or $q_1.m_1..m_2$=NULL or . . . or $q_1.m_1.., \ldots , ..m_{n-1}$=NULL or $q_1.m_1.., \ldots , ..m_n$ r k);
(ii) ($p_1$ r $p_2$)→($q_1.m_1$=NULL or $q_1.m_1..m_2$=NULL or . . . or $q_1.m_1.., \ldots , ..m_{n-1}$=NULL or $q_2.m_1$=NULL or $q_2.m_1..m_2$=NULL or . . . or $q_1.m_1.., \ldots , ..m_{m-1}$=NULL or $q_1.m_1.., \ldots , ..m_n$ r $q_2.m_1.., \ldots , ..m_m$), wherein:
$p_1$ is a path expression of the form $q_1.m_1..m_2.., \ldots , ..m_n$ in which attributes $m_1, \ldots , m_{n-1}$ can be NULL pointers,
r is a relational operator among $\{=, \neq, <, \leq, >, \geq\}$,
k is a constant, and
$p_2$ is a path expression of the form $q_2.m_1..m_2.., \ldots , ..m_n$ where $m_1, \ldots ,m_{n-1}$ are attributes that can be NULL pointers.

41. The method of claim 40, wherein the null protection transformations are applied during a plan optimization phase of query processing.

42. The method of claim 40, wherein the steps (a) and (b) are performed during a query rewrite phase of query processing.

43. A method for processing a query having a predicate with a subquery in a computer system, comprising the steps of:

using a two-valued logic system to process the query, the query being capable of having NULL values;

reducing each predicate in the query from a negative predicate to a positive predicate; and applying NULL pointer testing predicates to each predicate to ensure that path expression traversal does not extend beyond NULL pointers and to interpret predicates that include NULL pointers such that a NULL or False truth value are handled similarly by not being included in the result.

44. A query system for processing a query, the system comprising:

means for providing, in an environment where NULL values are unsupported, a tri-valued logic interpretation of predicates involving subqueries having a capability to have NULL pointers; and means for protecting the query system from abnormal termination due to dereferencing one of the NULL pointers.

45. A query system for processing queries, the system comprising:

means for processing, in an environment where NULL values are not supported, a predicate having a subquery having a capability to have NULL pointers, the means for processing further comprising:

means for employing a technique to handle each occurrence of a negative predicate, if any, as a logically equivalent positive predicate;

means for applying null tests to each resulting predicate; and means for interpreting the semantics of the NULL tested resulting predicate such that a presence of a NULL pointer or a NULL value is handled in a same way as if the predicate evaluated to False by not returning a result;

wherein the two-valued logic system simulates tri-valued logic and the query system does not terminate abnormally if a NULL pointer is traversed.

46. The system of claim 45, wherein the means for processing further comprises means for transforming a quantified subquery, if any, into an existential form.

47. The system of claim 45, wherein the means for applying null tests further comprises:

means for applying an IS NOT NULL predicate to each node in a path expression of the resulting predicate;

means for AND'ing each node having the IS NOT NULL predicate applied to it;

means for interpreting a semantic of the IS NOT NULL as being TRUE if the path expression does not have a node which is a NULL pointer; and means for interpreting the semantic of the IS NOT NULL as being FALSE if the path expression has a node which is a NULL pointer.

48. A computer program on a computer usable medium for controlling a processing of a query by a query system, the program comprising:

program code means for providing, in an environment where NULL values are unsupported, a tri-valued logic interpretation of predicates involving subqueries having a capability to have NULL pointers; and program code means for protecting the query system from abnormal termination due to dereferencing one of the NULL pointers.

49. A computer program on a computer usable medium for controlling a processing of a query by a query system, the program comprising:

program code means for controlling the processing, in an environment where NULL values are not supported, of a predicate having a subquery having a capability to have NULL pointers, the means for controlling the processing further comprising:

program code means for employing a technique to handle each occurrence of a negative predicate, if any, as a logically equivalent positive predicate;

program code means for applying null tests to each resulting predicate; and program code means for causing an interpretation of the semantics of the evaluation of the NULL tested resulting predicate such that a presence of a NULL pointer or a NULL value is handled in a same way as if the predicate evaluated to False by not returning a result;

wherein a two-valued logic system is enabled to simulate tri-valued logic and the query system does not terminate abnormally if a NULL pointer is traversed.

50. The system of claim 49, wherein the program code means for processing further comprises program code means for transforming a quantified subquery, if any, into an existential form.

* * * * *

UNITED STATES PATENT AND TRADEMARK OFFICE
CERTIFICATE OF CORRECTION

Page 1 of 2

PATENT NO. : 5,905,982
DATED : May 18, 1999
INVENTOR(S) : Michael James, et al.

It is certified that error appears in the above-identified patent and that said Letters Patent is hereby corrected as shown below:

Column 21, Claim 22, Line 46, delete "$<$" and replace with --$\leq$--

Column 21, Claim 22, Line 46, delete "$>$" and replace with --$\geq$--

Column 23, Claim 39, Line 60 before "(i)" delete "$<$"

Column 23, Claim 39, Line 67, after "$m_1$" delete "..$m_2$" (1st occurrence).

Column 24, Claim 39, Line 6, delete "$<$" and replace with --$\leq$--

Column 24, Claim 39, Line 6, delete "$>$" and replace with --$\geq$--

Column 24, Claim 40, Line 45, delete "$q_1$" and replace with --$q_2$-- (1st. occurrence).

UNITED STATES PATENT AND TRADEMARK OFFICE
CERTIFICATE OF CORRECTION

PATENT NO. : 5,905,982
DATED : May 18, 1999
INVENTOR(S) : Michael James Carey, et al.

It is certified that error appears in the above-identified patent and that said Letters Patent is hereby corrected as shown below:

Column 24, Claim 40, Line 51, delete "$<$" and replace with -- $\leq$ --

Column 24, Claim 40, Line 52, "$>$" and replace with -- $\geq$ --

Signed and Sealed this

Eighteenth Day of April, 2000

*Attest:*

Q. TODD DICKINSON

*Attesting Officer*      Director of Patents and Trademarks